United States Patent [19]
Geiger

[11] 4,100,821
[45] Jul. 18, 1978

[54] MULTISTAGE GEAR CONTROLLING MECHANISM

[75] Inventor: Michael Geiger, Starnberg, Fed. Rep. Germany

[73] Assignee: Friedrich Deckel Aktiengesellschaft, Munich, Germany

[21] Appl. No.: 739,734

[22] Filed: Nov. 8, 1976

[30] Foreign Application Priority Data

Nov. 19, 1975 [DE] Fed. Rep. of Germany ....... 2551934

[51] Int. Cl.² ............................................. F16H 57/02
[52] U.S. Cl. ................................... 74/606 R; 184/6.12
[58] Field of Search ....................... 74/606 R; 184/6.12

[56] References Cited
U.S. PATENT DOCUMENTS

| | | | |
|---|---|---|---|
| 1,749,077 | 3/1930 | Kennedy | 74/606 UX |
| 2,106,870 | 2/1938 | Floss | 184/6.12 X |
| 2,439,521 | 4/1948 | Miller | 74/606 X |
| 2,697,965 | 12/1954 | Armitage | 184/6.12 X |
| 3,140,900 | 7/1964 | Martin | 74/606 X |
| 3,241,397 | 3/1966 | Wilkinson | 74/606 |

*Primary Examiner*—Alan Cohan
*Attorney, Agent, or Firm*—Blanchard, Flynn, Thiel, Boutell & Tanis

[57] ABSTRACT

An improvement in a multistage gear controlling mechnism having a plurality of individual support plates separate from the gear housing and which are mounted in the gear housing. The support plates are fixed by index bolts supported in the housing wall and extend from the hosing wall radially and are received in openings provided in the peripheral edge surface of the support plates to hold the support plates in position in the housing.

10 Claims, 3 Drawing Figures

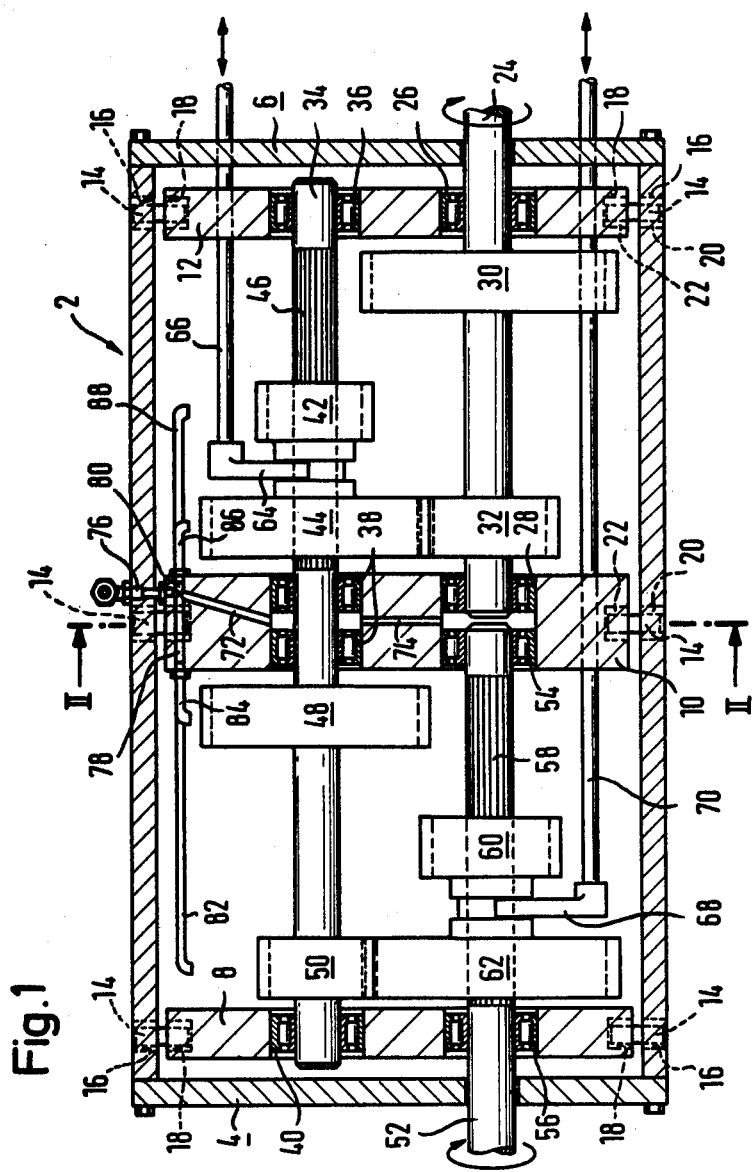

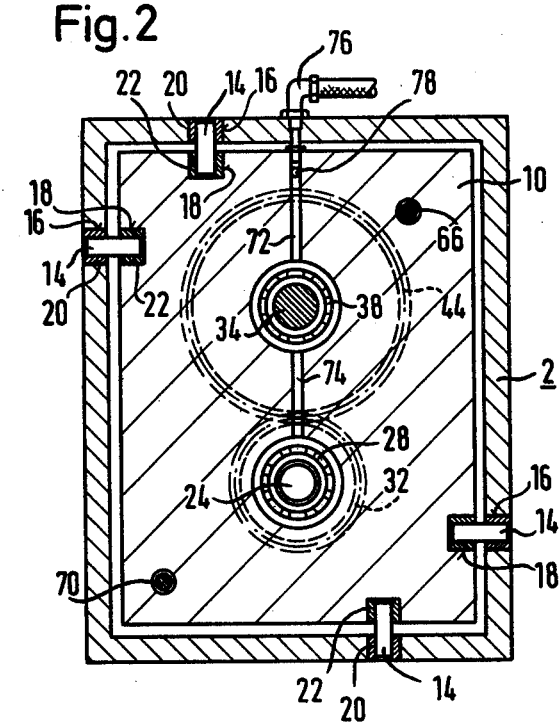
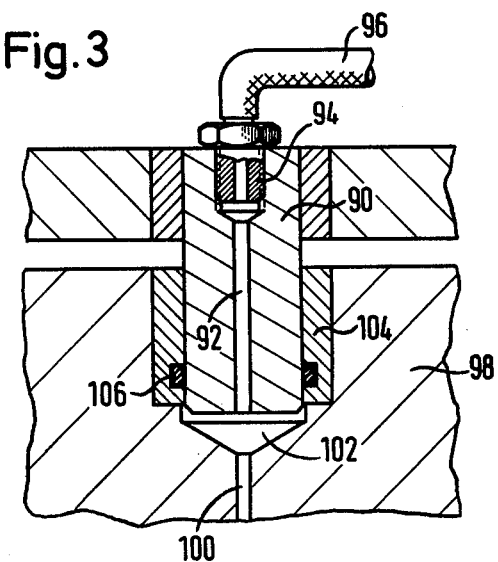

MULTISTAGE GEAR CONTROLLING MECHANISM

FIELD OF THE INVENTION

The invention relates to a multistage gear controlling mechanism which is arranged in a gear housing and having several spaced walls therein which are arranged for supporting the gear shafts.

BACKGROUND OF THE INVENTION

Multistage gear controlling mechanisms have as a rule a considerable structural length, which for example is determined by the number of the gears which are arranged side-by-side on the gear shafts and the length of the shifting path. It is therefore necessary to support the gear shafts several times, for example between two adjacent gears or gear blocks. For this purpose the gear housings as a rule have several walls which form the bearing points for the gear shafts.

In known gearing mechanisms of the mentioned type, these walls are constructed for example in one piece with the closed or also divided gear housing. The working of the shaft passages in these walls is very complicated because of the great working depth and requires special working machines. In many cases, the gear housings include heavy columns, spindle sockets or the like, the handling of which and setting of which for the purpose of working is very complicated.

A further disadvantage of gear housings of the known type is seen in that, for example in the case of a faulty working of the walls, the entire gear housing or the entire next larger structural unit, with which same is to be integrated, becomes scrap and that in the case of a repair of the gearing this entire structural unit is blocked for the time of the repair.

Therefore, so-called slide-in gearings have already become known, in which a kind of a cage, consisting of the support walls and connecting and closing-off walls, is mounted together with the gear shafts and operating devices and is installed as a unit into the gear housing, which as a rule contains then also the lubricant trough. Thus the working problem and the repair problem are reduced, because the slide-in gearing unit offers a smaller, quickly exchangeable structural unit. At the same time, however, the disadvantage exists that the space needed for a complete slide-in gearing is greater than the space needed for installation of the gear parts directly into the gear housing. Furthermore to mount the slide-on gearing, again worked surfaces must be provided in the gear housing, so that a part of the aforedescribed problems remain in existence.

The purpose of the present invention is to produce a gearing unit of the abovementioned type, which is simple in structure and is thus simple and inexpensive to manufacture and install, and which requires little space.

This purpose is inventively achieved by the walls being constructed as individual support plates which can be inserted into the gear housing, which support plates can be fixed by means of index bolts or the like which are supported in the housing wall and extend from outside radially into the peripheral surfaces of the plates.

The support plates have preferably a small radial play with respect to the gear housing. Same can remain unworked on the inside, because the support plates are aligned and fixed by the index bolts and do not need to come into contact with the inner wall of the housing. For this reason, the inner cross-sectional shape of the gear housing is very freely selectable, because same is not predetermined by any kind of working requirements, for example the requirement that a working is supplied to take place by boring or turning.

Working of the support plates is very simple and can for example be made easier yet by clamping same together to a block and by working same like a workpiece.

The installation of the gearing unit can be done in such a manner that the support plates are mounted together with the gear shafts carrying the gears in a mounting device and are moved as a unit into the gear housing, where then the support plates are aligned exactly and fixed by the index bolts. The demounting takes place in a reversed manner.

An important advantage of the inventive solution is seen also in the gearing being able to be installed for example in a pipe-shaped housing without lateral openings which is, from the viewpoint of bending and torsion rigidity, the optimum solution.

According to a further characteristic of the invention, the index bolts can be placed from outside through through holes in the housing wall so that also the manufacture of said holes in the housing can be done from outside.

To lubricate the gearing inside the housing, the invention provides that the individual support plates are provided with channels which can be connected to a lubricant supply and which extend to bearing points. Tubes or the like can branch off from these channels, which lines supply the gears with lubricant.

A technically easy mounting solution results when the supply of the lubricant to the support plates is done from outside of the gear housing through the housing wall, so that inside of the gear housing a pipe line system does not need to be installed.

BRIEF DESCRIPTION OF THE DRAWINGS

One exemplary embodiment of the invention is illustrated in the drawings and will be described more in detail hereinafter.

In the drawings:

FIG. 1 is a longitudinal cross-sectional view of a two-stage gear controlling mechanism with three support plates;

FIG. 2 is a cross-sectional view along the line II—II of FIG. 1;

FIG. 3 illustrates in an enlarged scale an index bolt for fixing a support plate and having an integrated lubricant feed.

DETAILED DESCRIPTION

A gear controlling mechanism, which is illustrated in FIGS. 1 and 2, comprises a gear housing 2 opened at both ends with the two opened ends being closable by end plates 4 and 6. Three support plates 8, 10 and 12 are arranged within the gear housing 2 and support several gear shafts having gears thereon.

The gear housing is formed in the present example by a simple pipe having a rectangular cross section. The cross-sectional design can be chosen freely, namely independent from any operational considerations because the gear housing does not need to be worked, particularly the inside thereof. The support plates are spaced on all sides from the inside surface of the gear housing, which space also takes into consideration the common casting tolerances.

The support plates 8, 10 and 12 are aligned and secured by index bolts 14 which are received in through holes 16 in the walls of the gearing housing 2 into corresponding receiving holes 18 in the peripheral edge surfaces of the two end support plates 8 and 12. Both the through holes 16 and also the receiving holes 18 are equipped with ground sleeves 20 or 22 and in which the index bolts are received.

To align and fix, for example the intermediate plate 10 (FIG. 2), the two lateral, elevationally offset arranged index bolts in the sides of the housing 2 would already be sufficient, because through them a fixing of the support plate in all directions of movement and about all axes of rotation in the housing chamber would be accomplished. However, and to assure an additional stabilization, two further, for example, upper and lower index bolts 14, are provided.

The support plates serve mainly to support the gear shafts. The input shaft 24 is supported at one end by a roller bearing 26 in the support plate 12 and at the other end by roller bearings 28 in the support plate 10. The input shaft 24 carries two gears 30 and 32 having different diameters.

The main shaft 34 is arranged parallel to the input shaft 24 and extends through the entire gear housing 2. The main shaft 34 is also supported by a roller bearing 36 in the support plate 12, a pair of roller bearings 38 in the intermediate support plate 10 and by a roller bearing 40 in the support plate 8. In the area between the support plates 10 and 12, the main shaft carries a gear block which consists of the gears 42 and 44 and which can be selectively coupled to the gears 30 or 32. The gear block is not only fixedly connected for rotation with the main shaft 34 for example by serrations 46 but is slidable axially on the main shaft 34.

In the area between the support plates 8 and 10, the main shaft 34 has fixedly mounted thereon two gears 48 and 50 of differing diameters. An output shaft 52 which is coaxial with respect to the input shaft 24 is supported at one end by a roller bearing 54 in the intermediate support plate 10 and at the other end by a roller bearing 56 in the plate 8. Because of the two roller bearings 28 and 54 which are arranged side-by-side, the intermediate support plate 10 must have a greater thickness than the two outer support plates. The output shaft 52 carries an axially movable gear block consisting of the gears 60 and 62, which is not only fixedly connected for rotation with said output shaft by serrations 58 but is slidable axially on the main shaft. This gear block is couplable selectively with the gears 48 or 50.

To move the gears 42 and 44, a claw 64 is used, which can be operated by a push rod 66. This push rod is guided through the support plate 12 and is supported movably in same.

A claw 68 having a push rod 70 serves correspondingly to operate the gears 60 and 62. The push rod 70 is movably supported and guided in the support plates 10 and 12.

As is particularly illustrated in connection with the example of the support plate 10, the support plates have channels 72 and 74, which connect to the roller bearings 38, 28 and 54 and are connected to a lubricant supply line 76. Furthermore, further channels 78 and 80 branch off from the channel 72 and to which channels 78 and 80 tubes 82, 84, 86 and 88 are connected for supplying lubricant to the gears 42, 44, 48 and 50.

As has not been illustrated in any more detail for reasons of a better understanding, each support plate can have such channels and tubes therein connected to a common lubricant supply. The lubricant collects in a conventional manner in a not illustrated lubricant frustum and is sucked off from there and is again fed to the machine through filters or the like.

FIG. 3 illustrates a further exemplary embodiment for a lubricant feed through an index bolt 90. The index bolt 90 has a through hole 92. A connecting piece 94 is screwed into the upper end of the hole 92 and receives a lubricant line 96. A channel 100 which is constructed in the support plate 98 terminates directly in a receiving hole 102 for the index bolt 90. To seal off the receiving hole 102 toward the outside, a seal 106 is arranged between index bolt 90 and a receiving sleeve 104.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a multistage gear controlling mechanism which is arranged in a gear housing having several walls which are arranged one behind the other for supporting the gear shafts, the improvement comprising wherein the walls are constructed as individual support plates separate from the gear housing and which are mounted in the gear housing, said support plates having unfinished peripheral edge surfaces and being smaller in dimension than the inside dimension of said housing to define a gap therebetween encircling said support plates, first means defining a plurality of recesses in said peripheral edges of each of said individual support plates, second means defining openings through the walls of said housing, said recesses on said peripheral edges of said support plates being positionable for axial alignment with said openings, index bolt means supported in said housing walls for fixedly locating said support plates in said housing, said index bolt means extending from outside of said housing wall laterally inwardly across said gap and into said recesses in said peripheral edge surfaces of said support plates.

2. The improvement according to claim 1, wherein said support plates have bearing means therein and wherein at least one of said support plates includes means defining channels therein for supplying a lubricant to said bearing means.

3. The improvement according to claim 2, wherein said channel means extend in said one support plate substantially inwardly from said peripheral edge surface and include conduit means for bridging said gap to facilitate a connection to a lubricant line which extends from outside through said housing wall.

4. The improvement according to claim 3, wherein said bearing means rotatably support shafts, said shafts having gears mounted thereon and positioned between said support plates, wherein said channel means includes at least one tube which extends to a position adjacent one of said gears.

5. The improvement according to claim 4, wherein said channel means extends to one common position on said housing wall to facilitate a lubricant supply thereto from one common lubricant line.

6. The improvement according to claim 1, wherein said openings in said housing wall for said index bolt means have sleeves snugly received therein and encircling said index bolt means to facilitate a precise positioning of said support plates within said housing.

7. The improvement according to claim 4, wherein said selected ones of said gears is adjustable axially of the supporting shaft therefor, including reciprocal shifting rods having claws thereon for manipulating the axial position of said selected gears relative to the supporting shaft therefor and other gears on other shafts, and wherein said support plates include guide means thereon for guiding said shifting rods therein for operating and shifting said claws.

8. The improvement according to claim 1, wherein said housing has a substantially rectangular inner cross section and wherein said support plates have a corresponding, but smaller, shape.

9. The improvement according to claim 3, wherein said index bolt means includes plural pins each bridging said gap and having a smooth external surface and wherein at least one of said pins has means defining a through hole therein and coupling means at one end for facilitating a connection to a lubricant line and the other end is connected in fluid circuit with said channel means.

10. The improvement according to claim 4, wherein said channel means includes means defining at least two passageways in said one support plate, a first of said passageways having said tubes connected in fluid circuit therewith and a second of said passageways extending to said bearing means.

* * * * *

UNITED STATES PATENT AND TRADEMARK OFFICE
CERTIFICATE OF CORRECTION

PATENT NO. : 4 100 821
DATED : July 18, 1978
INVENTOR(S) : Michael Geiger

It is certified that error appears in the above-identified patent and that said Letters Patent are hereby corrected as shown below:

Column 6, Line 1; change "3" to ---2---.

Signed and Sealed this

Twenty-seventh Day of February 1979

[SEAL]

Attest:

RUTH C. MASON
Attesting Officer

DONALD W. BANNER
Commissioner of Patents and Trademarks